United States Patent [19]
Kennedy, Jr.

[11] 4,152,127
[45] May 1, 1979

[54] FILTER CLEANING DEVICE

[76] Inventor: Alvin B. Kennedy, Jr., P.O. Box 282, Angleton, Tex. 77515

[21] Appl. No.: 784,584

[22] Filed: Apr. 4, 1977

[51] Int. Cl.² .............................................. B01D 46/04
[52] U.S. Cl. .................................... 55/304; 55/341 R; 55/96
[58] Field of Search ................... 55/96, 286, 287, 288, 55/293, 299, 300, 304, 305, 341 R

[56] References Cited

U.S. PATENT DOCUMENTS 1,082,356  12/1913  Newkirk ................................ 55/300

FOREIGN PATENT DOCUMENTS 2101812  8/1972  Fed. Rep. of Germany ............... 55/96
410524  5/1934  United Kingdom ........................ 55/305
616891  1/1949  United Kingdom ........................ 55/288
802475  10/1958  United Kingdom ....................... 55/305
845113  8/1960  United Kingdom ........................ 55/304

Primary Examiner—Bernard Nozick
Attorney, Agent, or Firm—Guy E. Matthews

[57] ABSTRACT

Apparatus is provided for cleaning a filter to permit continuous gas filtering operations. At least one filter is used in a gas filtering device to remove particulate matter from the gas. A support mechanism movably supports the filter. Urging apparatus is used in the device for urging the filter into a tense position. Releasable automatic moving apparatus is provided to automatically overcome the urging apparatus and moving the filter to a less tense position and thereupon released for returning the filter to the tense position thereby causing removal of particulate matter from the filter.

6 Claims, 5 Drawing Figures

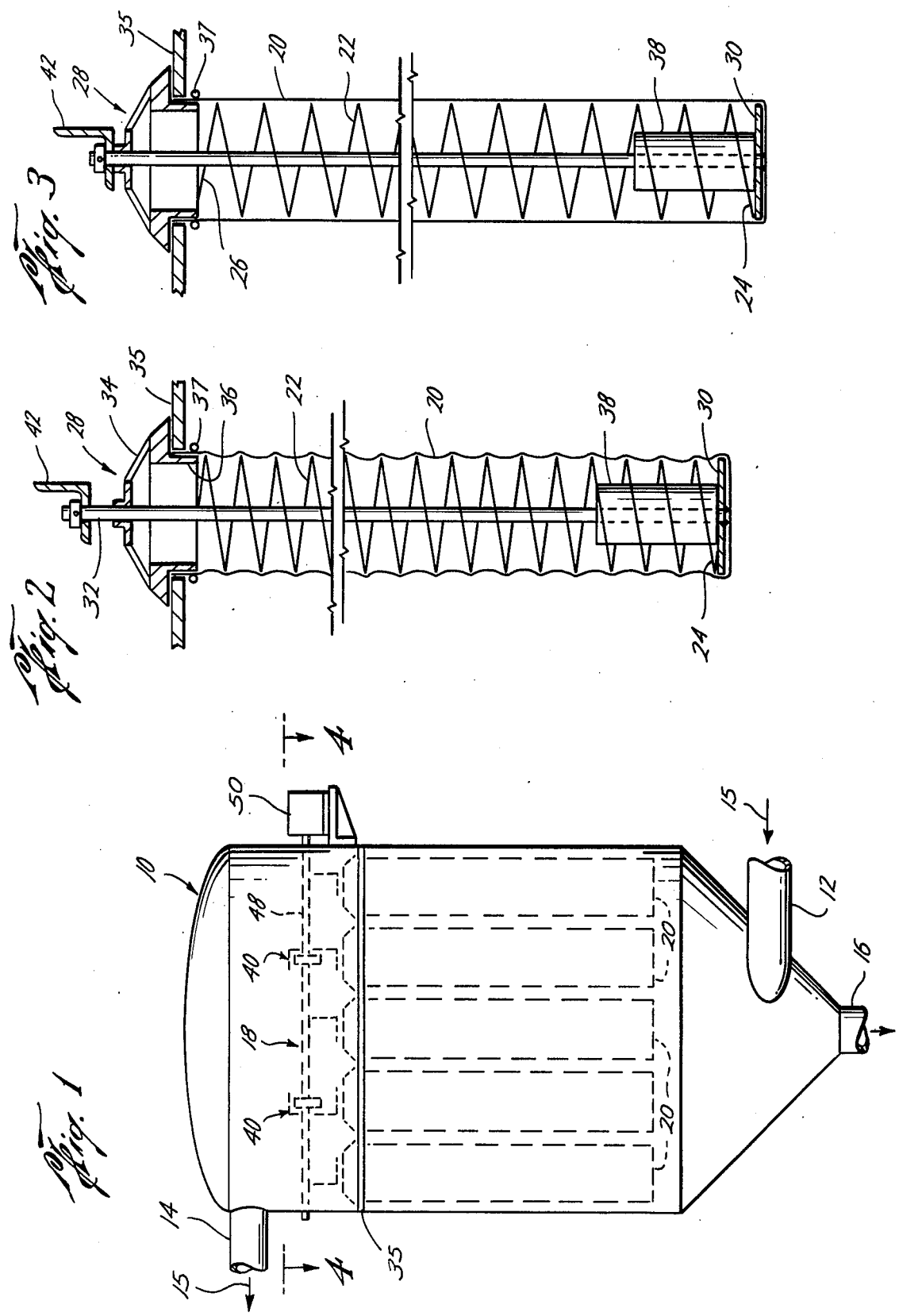

FILTER CLEANING DEVICE

BACKGROUND AND SUMMARY OF THE INVENTION

The removal of particulate matter from a gas by a filtering material is well known. Such filtering is done to either clean contaminents from the gas or to remove particulate matter from the gas for the matter to be reclamated and reused. Normally, the filter is located within a gas filtering device and the gas flows through the filtering material with the particulate matter being removed from the gas. As the filtering continues, the particulate matter adheres to the filtering material, which leads to a large pressure drop with eventual stoppage of gas flow past the filter. Thus, cleaning devices are necessary to remove the particulate matter from the filter.

The most common cleaning device used to date employs a gas jet. A nozzle is positioned on the upstream side of the filter with gas being periodically passed through to blow the particulate matter from the filter. The gas jet is periodically activated to permit the continuous use of the gas filtering device. The gas jet, however, can cause a substantial back flow of the gas in low pressure filtering systems, which is undesirable. Further, the gas used in the jet must be replaced, which is expensive. Moreover, the gas jet directly striking the filter can sometimes cause damage to the filter.

Accordingly, it is a primary aim of the present invention to provide mechanical apparatus for removing particulate matter from a filter used in a continuously operating gas filtering device.

Further, an aim of the present invention is to provide mechanical apparatus for removing particulate matter from a filter used in a continuously operating gas filtering device which is easy to construct and inexpensive to use.

Another aim of the present invention is to provide mechanical apparatus for automatically removing particulate matter from a filter used in a gas filtering device which permits continuous operation of the gas filtering device.

In accordance with the invention, apparatus is provided to remove particulate matter from a filter used in a continuously operating gas filtering device. There is at least one filter disposed within the device for removing particulate matter from the gas. A support is provided to move the filter. Urging apparatus is mounted with the support means for urging the filter into a tense position. Releasable automatic moving apparatus is connected to the support for overcoming said urging means and moving said filter from the tense position to a less tense position thereupon released for returning the filter to the tense position thereby causing removal of the particulate matter from the filter.

BRIEF DESCRIPTION OF THE DRAWINGS

Other objects and advantages of the invention will become apparent upon reading the following detailed description and upon reference to the drawings, in which:

FIG. 1 is an elevational view of a gas filtering device embodying apparatus constructed according to the present invention.

FIG. 2 is an enlarged elevational view, partly in section, of a filter cleaning device constructed according to the present invention with the filtering material in a less tense or slack position.

FIG. 3 is an enlarged elevational view, partly in section, showing the filter cleaning device of FIG. 2 with the filtering material in a tense position.

Figure 4:
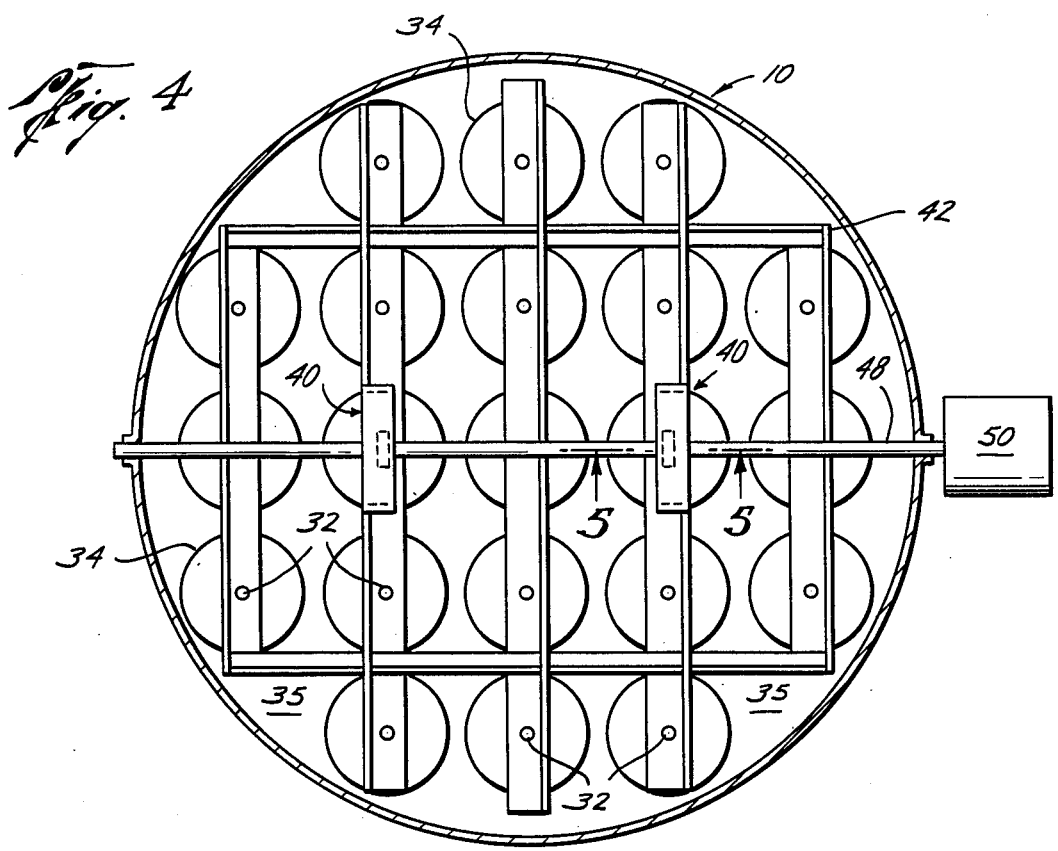
FIG. 4 is a plan view taken in the direction of arrows 4—4 of the gas filtering device shown in FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, a gas filtering device 10, such as a tank, is positioned within a gas carrying conduit for removing particulate matter carried by the gas. Tank 10 has an inlet 12 for receiving the gas particulate matter and an outlet 14 for continuing the passage of the filtered gas within the system. It is not important to the invention how an increased pressure is applied to inlet 12, as long as the gas flows in the direction of arrows 15. A particulate matter outlet 16 is provided at the bottom of tank 10 to remove the matter filtered from the passing gas by filtering apparatus 18. The collected particulate matter is preferably removed when gas no longer passes through tank 10 to insure that no contaminating gas from outside the system is added to the gas being filtered.

Filtering apparatus 18 is supported by tank 10 and has at least one filter 20 for removing the particulate matter from the gas. Preferably, a plurality of filters 20 are used, as shown in FIGS. 2 and 3. More specifically, filter 20 is in the shape of a tubular sock or bag with one end being open and the other end being closed. The filtering material used to construct each filter 20 is flexible and capable of withstanding a snap of sufficient force to remove any particulate matter adhering to the material. Further, when tank 10 is filtering a gas of high temperature, the filtering material must be capable of withstanding the temperature extremes. Such materials are well known in the art and the selection of any particular material is well within the skill of a person skilled in the art.

An urging apparatus, such as a coil spring 22, is positioned within each filter 20 to support the filter, force the filtering material toward the tense position and has a first end 24 and a second end 26. Each spring 22 is constructed with sufficient coils to provide support for filter 20 and prevent the bag from collapsing due to the pressure differential across the filter. However, the use of too many coils will unnecessarily inhibit the passage of the gas through filters 20.

A support apparatus 28 is used to movably support spring 22 and the filter bag 20 between the tense position, FIG. 3, and a less tense or slack position, FIG. 2. A circular plate 30 is used to support first end 24 of spring 22. When desired, plate 30 is provided with holes to permit the use of the bottom of each bag 20 for filtering the gas. A rod 32 is attached to the center of plate 30 and extends concentrically of spring 22 and is slidably supported by a hood 34. Hood 34 is disposed within apertures provided in a support plate 35 of tank 10 and joined to second end 26 of spring 22. A sleeve 36 is provided for hood 34 extending over spring 22 by a sufficient length to permit filter 20 to be attached by suitable apparatus, such as a hose spring clamp 37. By moving plate 30 upwardly, spring 22 is compressed and the material of each bag 20 is moved from the tense position, FIG. 3, to the slack position, FIG. 2. Although first end 24 of spring 22 may be attached to plate 30, it is preferred that rod 32 be of such length that spring 22 will exert a force against plate 30 at its lowest most position, as shown in FIG. 3. Thus, it becomes unnecessary to attach spring 22 to plate 30. Preferably, a tubular weight 38 is slidably positioned about rod 32 and rests upon plate 30.

Figure 5:
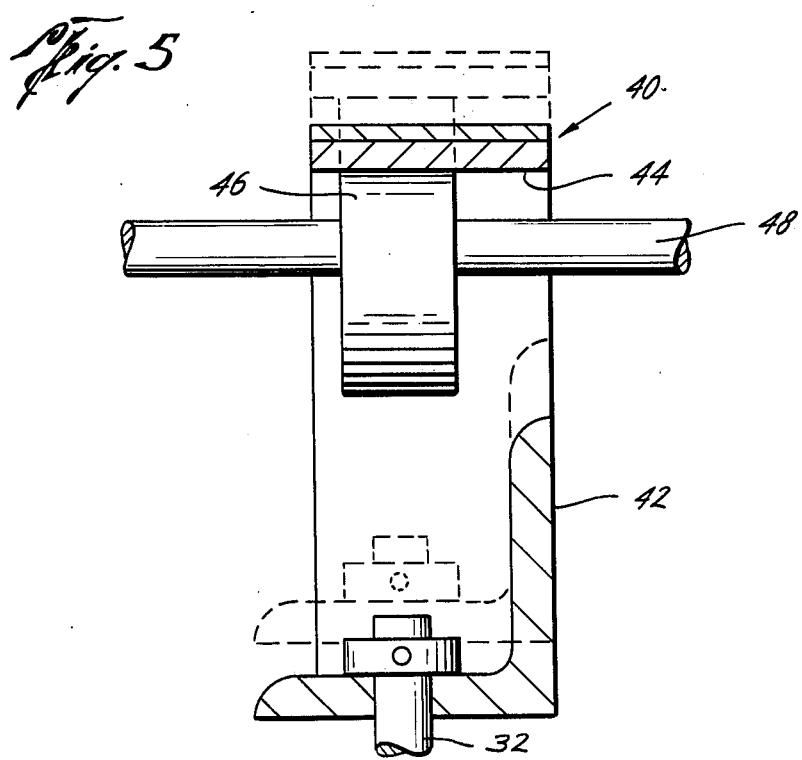
FIG. 5 is an enlarged elevational view taken in the direction of arrows 5—5 of a portion of the gas filtering device shown in FIG. 4.

As shown in FIGS. 4 and 5, automatic moving means 40 is used to move each filter 20 and support means 28 from the tense position to the slack position by attaching rod 32 to a frame 42. A follower 44 is connected to frame 42 and coacts with a cam 46 rotated by a drive shaft 48 connected to automatic control means 50. Cam 46 is designed to move support means 28 from the tense position to the slack position and release frame 42 and each rod 32 for a return of support 28 and filter 20 to the tense position. Control means 54 causes the movement of moving means 40 to automatically activate the removal of particulate matter from filter 20, which permits continuous operation of gas filtering device 10.

In operation, after a period of time has passed, control means 50 causes driving rod 48 to rotate. Cam 46 is, thus, rotated to move follower 44, frame 42 and rod 32 from the tense position to the less tense position. Preferably, the tense position is the normally filtering position, FIG. 3, with the tension in each filter 20 being caused by spring 22 pressing against plate 30. As rod 32 is moved to the slack position, FIG. 2, by cam 46, follower 44 and rod 32, the filtering material of bag 20 will converge slightly toward its center because of the pressure differential caused by the gas flow. Cam 46 disengages from follower 44 and rod 32 at the slack position to release the force in spring 22 to return bag 20 and plate 30 to the tense position. This action causes the filter to move and to even snap. This movement of the filter causes the removal of any particulate matter adhering to the filter. Further, the action of spring 22 moves plate 30 to the tense position with such speed that weight 38 remains at rest. Weight 38 then provides a secondary movement of the filter by dropping onto plate 30 at the tense position to further remove adhering particulate matter.

Thus, it is apparent that there has been provided, in accordance with the invention, a particulate matter remover from a continuously operating gas filtering device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the broad scope of the appended claims.

What is claimed is:

1. Apparatus used in a tank permitting continuous filtering of gas flowing from an inlet to an outlet of the tank, comprising:
   at least one filter mounted within the tank for removing particulate matter from the gas flowing from the inlet to the outlet of the tank, said filter being in the shape of a bag having an opened end through which the filtered gas passes,
   means mounted with the bag for movably supporting said filter between tense and less tense positions,
   means mounted with said support means for urging said filter into the tense position,
   releasable automatic moving means connected to said support means for overcoming said urging means to move said filter to the less tense position and thereafter releasing said moving means for returning said filter to the tense position, and
   means releasably mounted on said support means for imparting an additional tensing impact to the tensed filter which snaps the filter, thereby causing removal of the particulate matter from the filter.

2. The apparatus of claim 1, wherein said urging means is a coil spring and said support means includes a rod disposed concentrically within the coil spring and a circular plate is attached to an end of the rod for engaging an end of the spring to compress the spring when the filter is moved to the less tense position.

3. The apparatus of claim 2, wherein said filter is in the shape of a bag and said support means includes a hood which slidably supports the rod and has a sealing sleeve for attaching the open end of the bag to the hood with the bag enclosing the coil spring, the plate and a portion of the rod.

4. Apparatus used in a tank permitting continuous filtering of gas flowing from an inlet to an outlet of the tank, comprising:
   at least one filter mounted within the tank for removing particulate matter from the gas flowing from the inlet to the outlet of the tank, said filter being in the shape of a bag having an opened end through which the filtered gas passes;
   means mounted with the bag for movably supporting said filter between tense and less tense positions,
   means mounted with said support means for urging said filter into the tense position;
   releasable automatic means connected to said support means for overcoming said urging means to move said filter to the less tense position and thereafter releasing said moving means for returning said filter to the tense position, thereby causing removal of the particulate matter from the filter; and
   a weight movably supported on said support means for movement therewith from the tense position to the less tense position, said weight mounted with said support means to return to the tense position after a delay, and drop onto a portion of said support means for providing a secondary movement to the filter to aid in removing particulate matter from the filter.

5. The apparatus of claim 4, wherein said spring means is a coil spring and said support means includes a rod disposed concentrically within the coil spring and a circular plate is attached to an end of the rod for engaging an end of the spring to compress the spring when the filter is moved to the less tense position and said weight is slidably disposed around the rod to permit movement of the plate to the tense position before arrival of the weight to permit the weight to drop onto the plate for providing the secondary movement to the filter.

6. Apparatus used in a tank permitting continuous filtering of gas flowing from an inlet to an outlet of the tank, comprising:

a plurality of filters mounted within said tank for removing the particulate matter from the gas flowing from the inlet to the outlet of the tank, each said filter being in the shape of a bag with one end opened and the other end closed;

means mounted within said tank for movably supporting said filter between tense and less tense positions, said support means including a rod for each bag, each rod extending through the opened end of the respective bag, a circular plate for each rod attached to the end of the rod nearest the closed end of the bag, and a hood for each rod slidably supporting the respective rod having a sealing sleeve for attaching each bag at its opened end, the filtered gas passing out of the opened end;

means mounted with said support means for urging said filter toward the tense position, said urging means including a coil spring concentrically disposed around each rod of said support means, one end of each spring being mounted with the respective circular plate and the other end mounted with the respective hood of said support means;

releasable automatic moving means mounted with the rods of said support means for compressing the spring within each bag to remove each filter to the less tense position and thereupon releasing said rods which permits the springs to act on the plate and return said filters to their tense positions which snaps the filters and removes the particulate matter; and a weight slidably disposed around each rod to permit movement of each filter to the tense position before arrival of the weight, the weight subsequently dropping onto the plate to provide a secondary movement to the filter as an aid in removing the particulate matter.

* * * * *